(12) United States Patent
Su

(10) Patent No.: US 7,097,183 B1
(45) Date of Patent: Aug. 29, 2006

(54) TROLLEY STRUCTURE

(75) Inventor: Chung-Shiu Su, Kaohsiung Hsien (TW)

(73) Assignee: Best Caddy Co., Ltd., Kaohsiung Hsien (TW)

( * ) Notice: Subject to any disclaimer, the term of this patent is extended or adjusted under 35 U.S.C. 154(b) by 0 days.

(21) Appl. No.: 11/091,437

(22) Filed: Mar. 29, 2005

(51) Int. Cl.
*B62B 1/12* (2006.01)

(52) U.S. Cl. ............ 280/47.29; 280/40; 280/646; 280/652

(58) Field of Classification Search ............ 280/47.29, 280/40, 652, 646
See application file for complete search history.

(56) References Cited

U.S. PATENT DOCUMENTS

| | | | | |
|---|---|---|---|---|
| 2,505,440 A * | 4/1950 | Taber et al. | ............ | 280/38 |
| 4,448,434 A * | 5/1984 | Anderson | ............ | 280/40 |
| 4,993,727 A * | 2/1991 | vom Braucke et al. | ....... | 280/40 |
| 5,072,958 A * | 12/1991 | Young | ............ | 280/40 |
| 5,312,006 A * | 5/1994 | Lag | ............ | 211/195 |
| 5,348,325 A * | 9/1994 | Abrams | ............ | 280/40 |
| 5,439,239 A * | 8/1995 | Su | ............ | 280/40 |
| 5,468,005 A * | 11/1995 | Yang | ............ | 280/40 |
| 5,630,601 A * | 5/1997 | vom Braucke et al. | ....... | 280/40 |
| 5,803,471 A * | 9/1998 | DeMars et al. | ............ | 280/40 |
| 5,984,327 A * | 11/1999 | Hsieh et al. | ............ | 280/47.24 |
| 6,053,514 A * | 4/2000 | Su | ............ | 280/40 |
| 6,425,599 B1* | 7/2002 | Tsai | ............ | 280/652 |
| 6,685,214 B1* | 2/2004 | Gregory | ............ | 280/652 |
| 2002/0180184 A1* | 12/2002 | Chang | ............ | 280/652 |

* cited by examiner

*Primary Examiner*—Christopher P. Ellis
*Assistant Examiner*—John Walters
(74) *Attorney, Agent, or Firm*—Rosenberg, Klein & Lee (57) ABSTRACT

A trolley structure allowing synchronous retraction or extension of a stand and two wheels includes a main frame, wheel bases, retainers, a stand, and a handlebar; each wheel base inserted onto a respective rod of the main frame and fixed with the respective retainer; the stand pivoted to the retainers; the handlebar inserted into retractable holders of the main frame; a plurality of troughs provided at the bottom of each wheel base; a driven gear pivoted to the outer edge of each retainer; a plurality of checking members provided on the driven gear to be held in the troughs for driving the driven gear to rotate; and an active gear provided on a first pivoting holder of the stand to mesh with the driven gear to drive the driven gear to turn.

6 Claims, 8 Drawing Sheets

TROLLEY STRUCTURE

BACKGROUND OF THE INVENTION (a) Field of the Invention

The present invention relates to a trolley structure, and more particularly, to one that allows reliable transmission and reduced stand area for savings in production cost and space consumed.

(b) Description of the Prior Art

Figure 7:
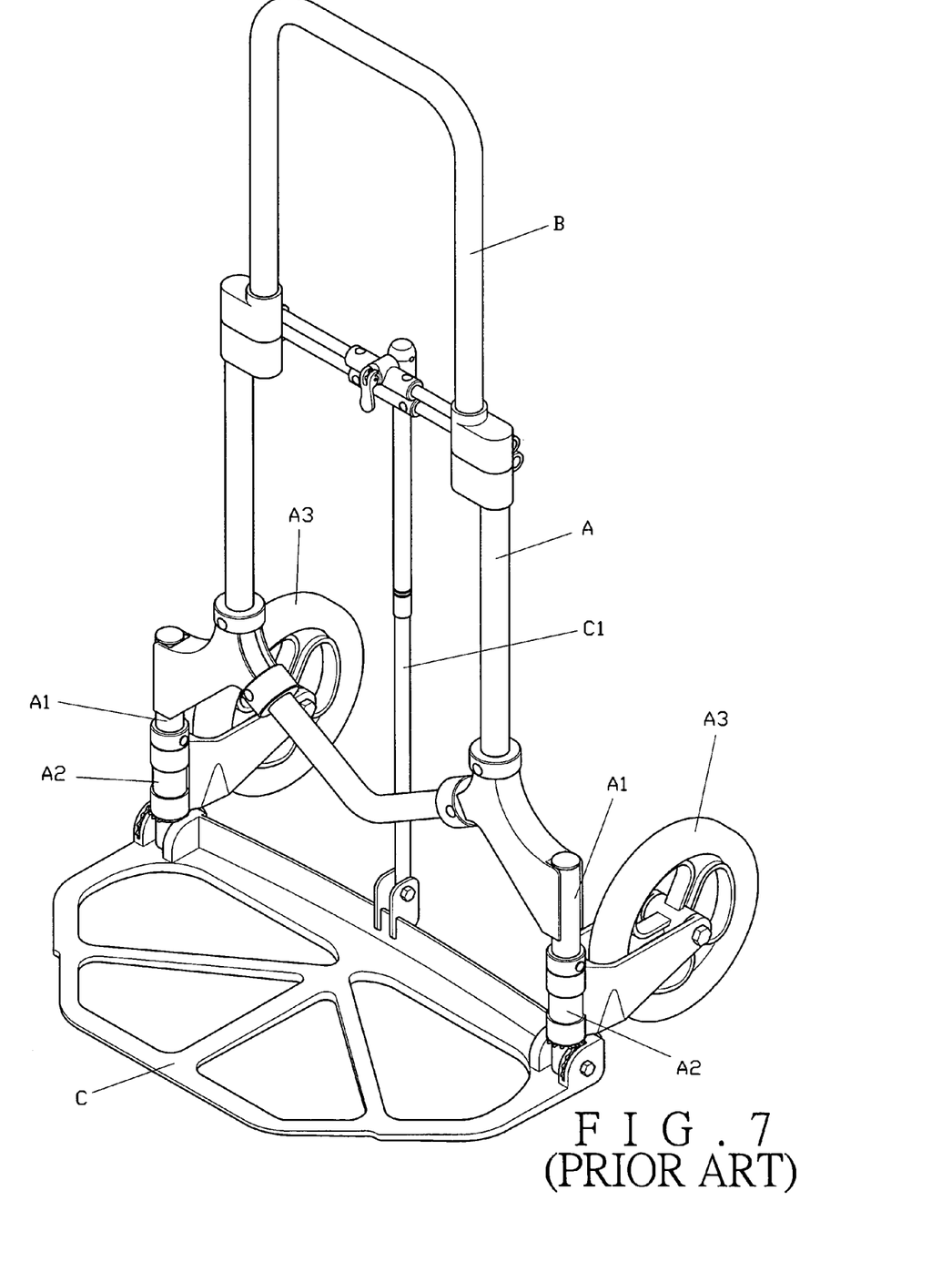
FIG. 7 is a perspective view of a prior art.
Figure 8:
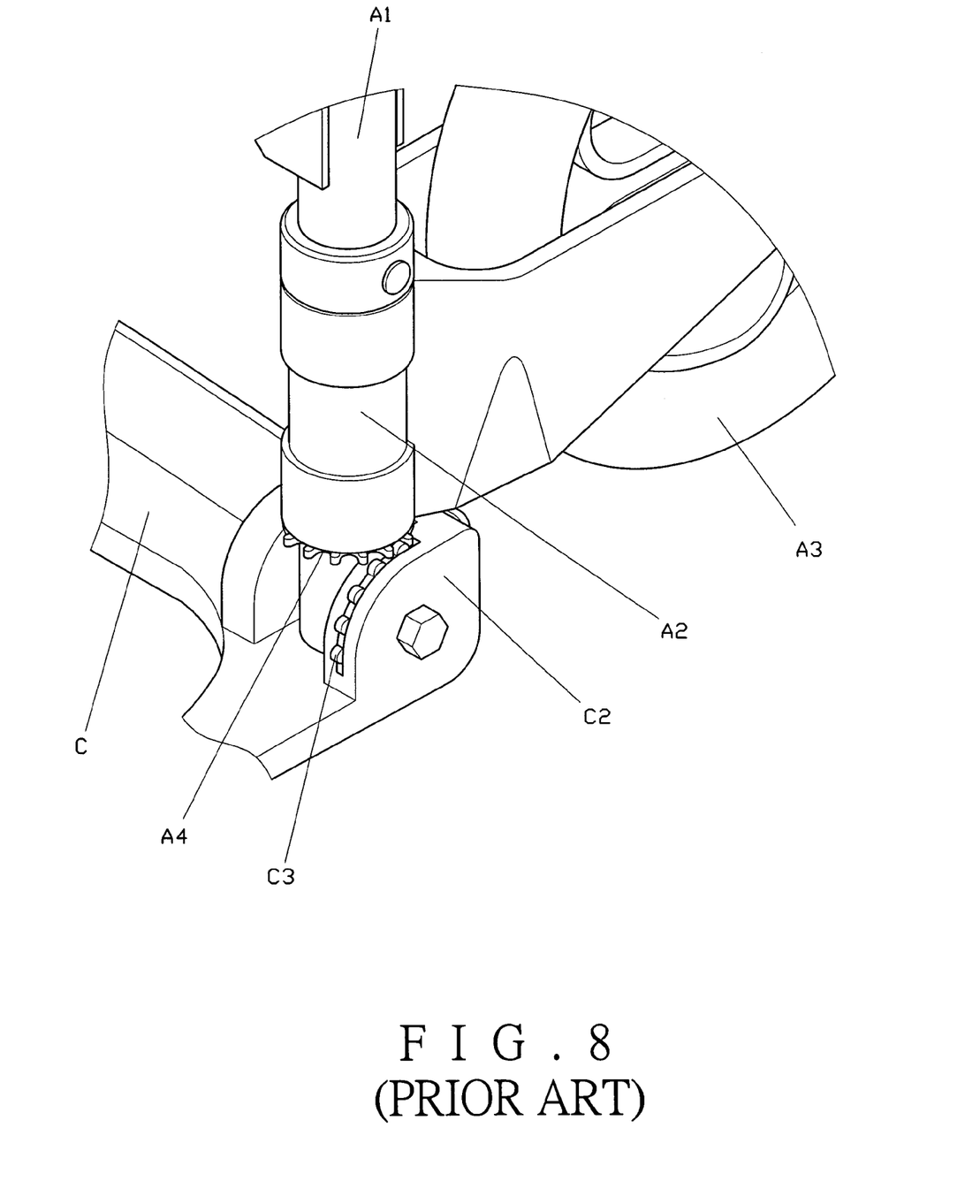
FIG. 8 is an enlarged view of the prior art.

Usually a conventional trolley is provided with a fixed stand, which is not easy to carry and consumes too much space. Therefore, an improved structure is therefore introduced, which is retractable as illustrated in FIG. 7 of the accompanying drawings. The trolley comprises a main frame (A) and a retractable handlebar (B). The main frame (A) comprises a pair of rods (A1) at respective bottom ends of the main frame (A). A rotary wheel frame (A2) is inserted onto each rod (A1) to hold a wheel (A3). A gear (A4) is provided on the quarter of the outer circumference at the bottom of each wheel frame (A2) as illustrated in FIG. 8. A stand (C) is pivoted to the bottom of each rod (A1) and is connected with a telescopic rod (C1). Another end of the telescopic rod (C1) is connected to the handlebar (B). A U-shaped pivoting section (C2) is each provided on respective sides of the stand (C). One inner side of the pivoting section (C2) is provided with a gear (C3) to engage with the gear (A4) of the wheel base (A2) so that when the stand (C) is folded, the gear (C3) in the pivoting section (C2) of the stand (C) turns upwardly for 90 degrees while the gear (A4) of the wheel frame (A2) relatively rotates for a quarter of a turn. Meanwhile, the wheel frame (A2) turns for a quarter of a turn together with the gear (A4) for the wheel (A3) to be collapsed in flushed against the side age of the rod (A1). Accordingly, both the stand (C) and the wheels (A3) can be easily and synchronously collapsed.

However, the pivoting section (C2) of the stand (C) has to accommodate the rod (A1) of the main frame (A) to prevent the attempt of reducing the spacing between the stand (C) and the rod (A1). As a result the excessively large area of the stand (C) consumes too much space. Furthermore, the gear (A4) of the wheel frame (A2) for being disposed on the outer circumference prevents reliable engagement with the gear (C3) and even the teeth could easily break down to fail the turning.

SUMMARY OF THE INVENTION

The primary purpose of the present invention is to provide an improved structure of a trolley extension mechanism. To achieve the purpose, a main frame is provided with a pair of rods at the bottom and a pair of retractable holders at the top. A wheel base is each inserted onto the rods of the main frame. Each wheel base is provided with a wheel and an opening. A retainer secured to each rod of the main frame is also provided with an opening. A stand is pivoted to the retainers. A first pivoting holder is each provided to respective sides of the stand. A handlebar is inserted into the retractable holders of the main frame. The handlebar is pivoted with an extension connector with another end of the extension connector being pivoted to the stand. Each wheel base comprises a plurality of troughs at the bottom. A first through hole is provided on each rod of the main frame while a corresponding first through hole is provided on each retainer. Both through holes respectively on the rod and the retainer are inserted with a first pivoting member. The first pivoting member is pivotally connected with a driven gear at the outer edge of the retainer. The driven gear comprises a plurality of checking members to be held in the troughs of the wheel base so to drive the wheel base to rotate. Each first pivoting holder of the stand is provided with an active gear to mesh with the driven gear to drive the driven gear to turn around.

The present invention provides the following advantages:
1. Whereas the active gear is made and integrated to the outer side of the first pivoting holder, only limited spacing is required when the active gear meshes with the driven gear, thus is helpful in reducing the area of the stand for savings in production cost and space consumption.
2. Whereas a plurality of troughs are provided at the bottom of the wheel base and a fan-shaped member is provided to one side of the driven gear, and a plurality of checking members are provided to the peripheral edge of the fan-shaped member to insert into the troughs for providing reliable transmission.

DETAILED DESCRIPTION OF THE PREFERRED EMBODIMENTS

Figure 1:
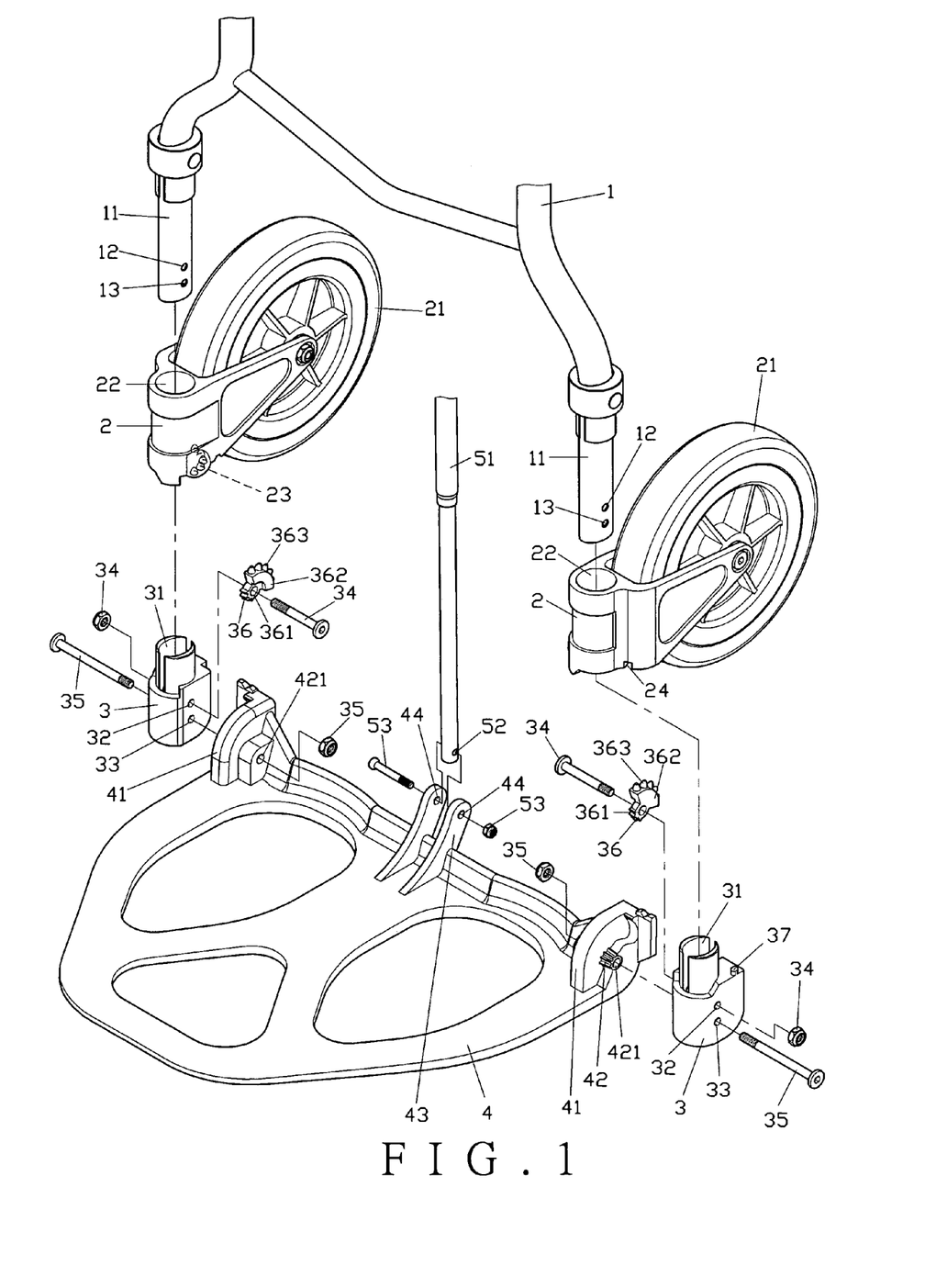
FIG. 1 is an exploded view of a preferred embodiment of the present invention.
Figure 2:
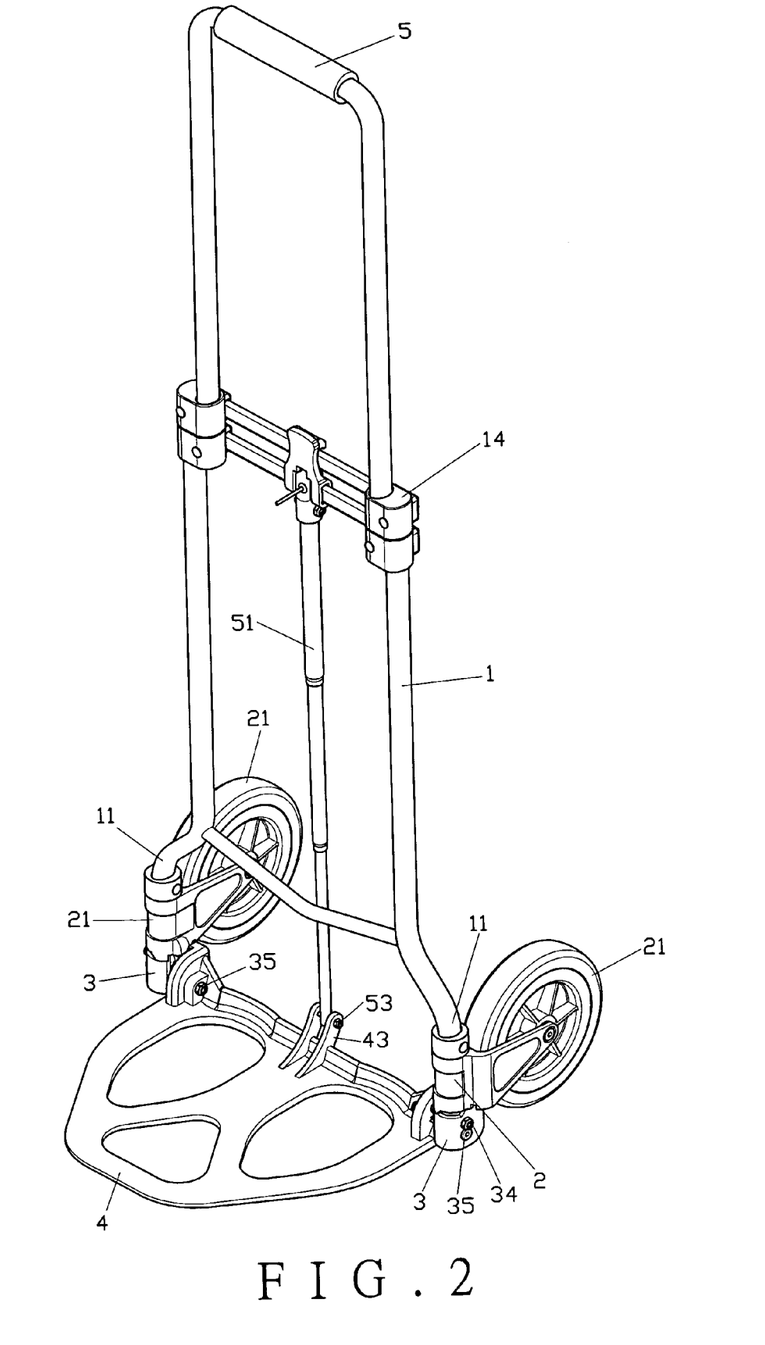
FIG. 2 is a perspective view of the preferred embodiment of the present invention.

Referring to FIGS. 1 and 2, a preferred embodiment of the present invention comprises a main frame (1), wheel bases (2), retainers (3), a stand (4), and a handlebar (5).

The main frame (1) is at its bottom on respective sides provided with a rod (11). Each rod (11) is provided with a first through hole (12) and a second through hole (13). A retractable holder (14) is each provided at respective top ends of the main frame (1).

Each wheel base (2) inserted onto the respective rod (11) of the main frame (1) is provided with a wheel (21) and an opening (22), while a plurality of troughs (23) and a chute (24) are provided at the bottom of each wheel base (2).

Each retainer (3) secured to the respective rod (11) of the main frame (1) is provided with an opening (31), a first through hole (32) and a second through hole (33) to respectively receive insertion of a first pivoting member (34) and a second pivoting member (35). A driven gear (36) is pivoted to the first pivoting member (34) at the outer edge of the retainer (3). The driven gear (36) comprises an axial hole (361) and a fan-shaped member (362) at one side of the driven gear (36). A number of checking members (363) are provided on the peripheral edge of the fan-shaped member (362). Each retainer (3) further comprises a pole (37) protruding from the top of the retainer (3).

The stand (4) is pivotally connected to the retainers (3). A first pivoting holder (41) is each provided to respective sides of the stand (4). An active gear (42) is provided to the outer side of and made integrated with the first pivoting holder (41). The active gear (42) comprises an axial hole (421). A second pivoting holder (43) is provided at the middle section of the stand (4). The second pivoting holder (43) comprises a pair of pivoting holes (44).

The handlebar (5) inserted into the retractable holders (14) of the main frame (1) extends or retracts vertically on the main frame (1). One end of an extension connector (51) is pivotally connected to the handlebar (5). Another end of the extension connector (51) is provided with a pair of pivoting holes (52) to receive insertion of a third pivoting member (53).

Figure 3:
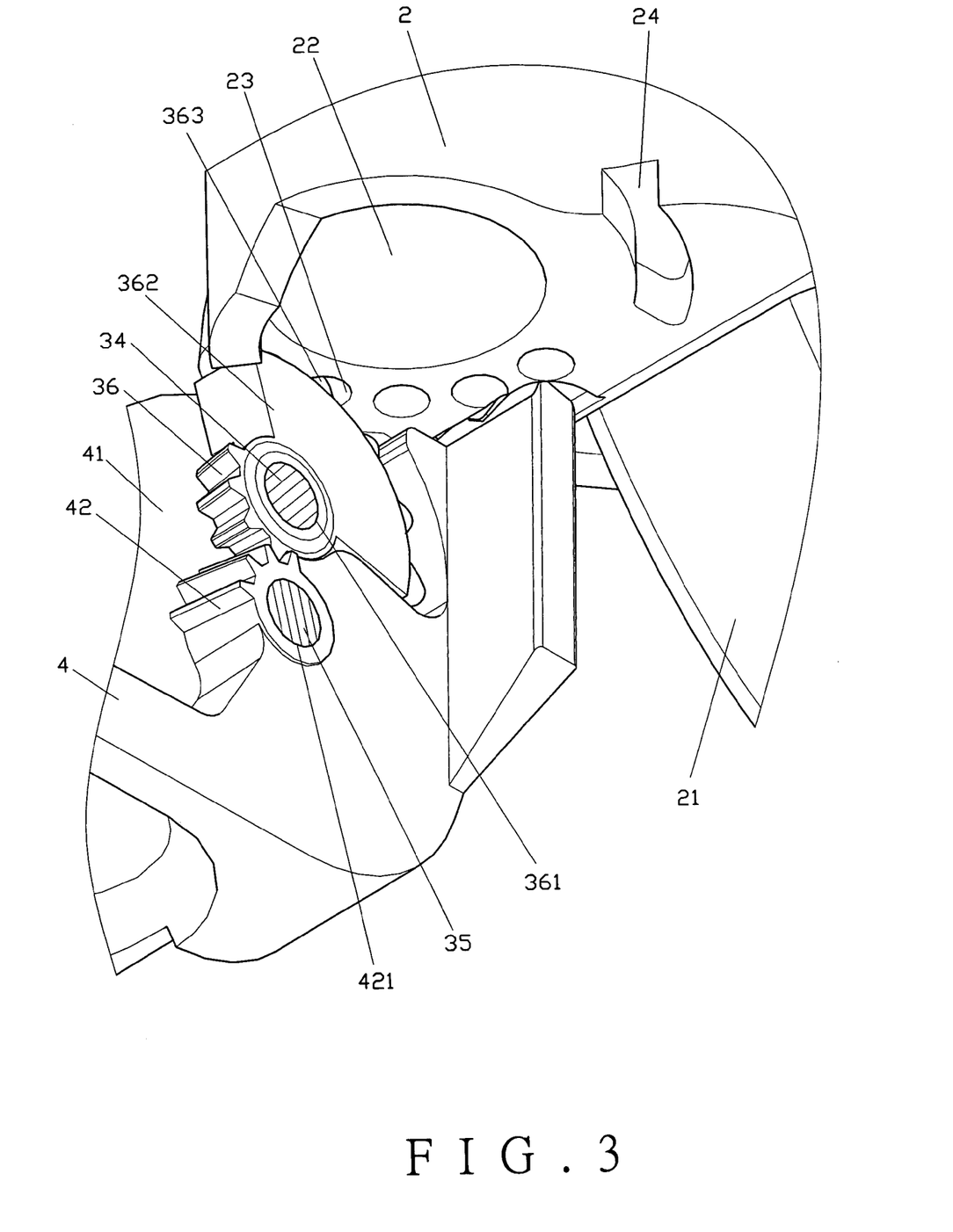
FIG. 3 is an enlarged view showing engagement between an active gear and a driven gear of the preferred embodiment of the present invention.
Figure 4:
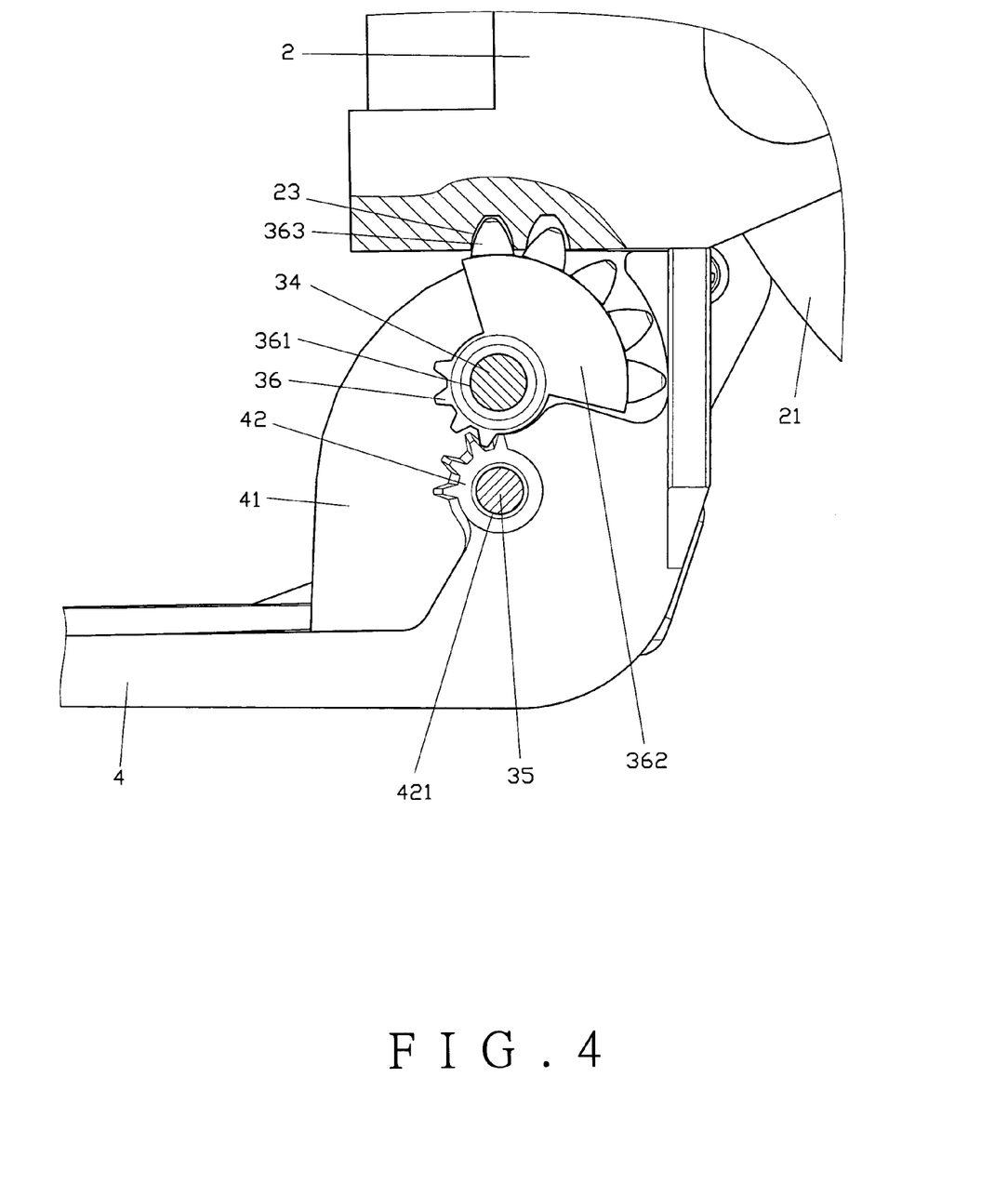
FIG. 4 is a cross-sectional view showing engagement between the active gear and the driven gear of the preferred embodiment of the present invention.

As illustrated in FIG. 2 when the preferred embodiment is assembled, the openings (22, 31) of the wheel bases (2) and the retainers (3) are inserted in sequence onto the rods (11) of the main frame (1) leaving the poles (37) of the retainers (3) to extend into the chutes (24) of the wheel bases (2) for sliding into position. The axial hole (361) of each driven gear (36) is abutted to the outer edge of the first through hole (32) of the respective retainer (3) to receive insertion of the first pivoting member (34) and to allow the checking members (363) of the fan-shaped member (362) of the driven gear (36) to be held in the troughs (23) at the bottom of the wheel base (2) as illustrated in FIGS. 3 and 4. The axial hole (421) of each active gear (42) of the stand (4) is abutted to the outer edge of the second through hole (33) of the respective retainer (3) for insertion of the second pivoting member (35). Both the active gear (42) and the driven gear (36) are to engage with each other. Finally, the pivoting holes (52) of the extension connector (51) of the handlebar (5) are abutted to the pivoting holes (44) of the second pivoting holder (43) of the stand (4) for insertion of the third pivoting member (53) to achieve fast assembly of the present invention.

Figure 5:
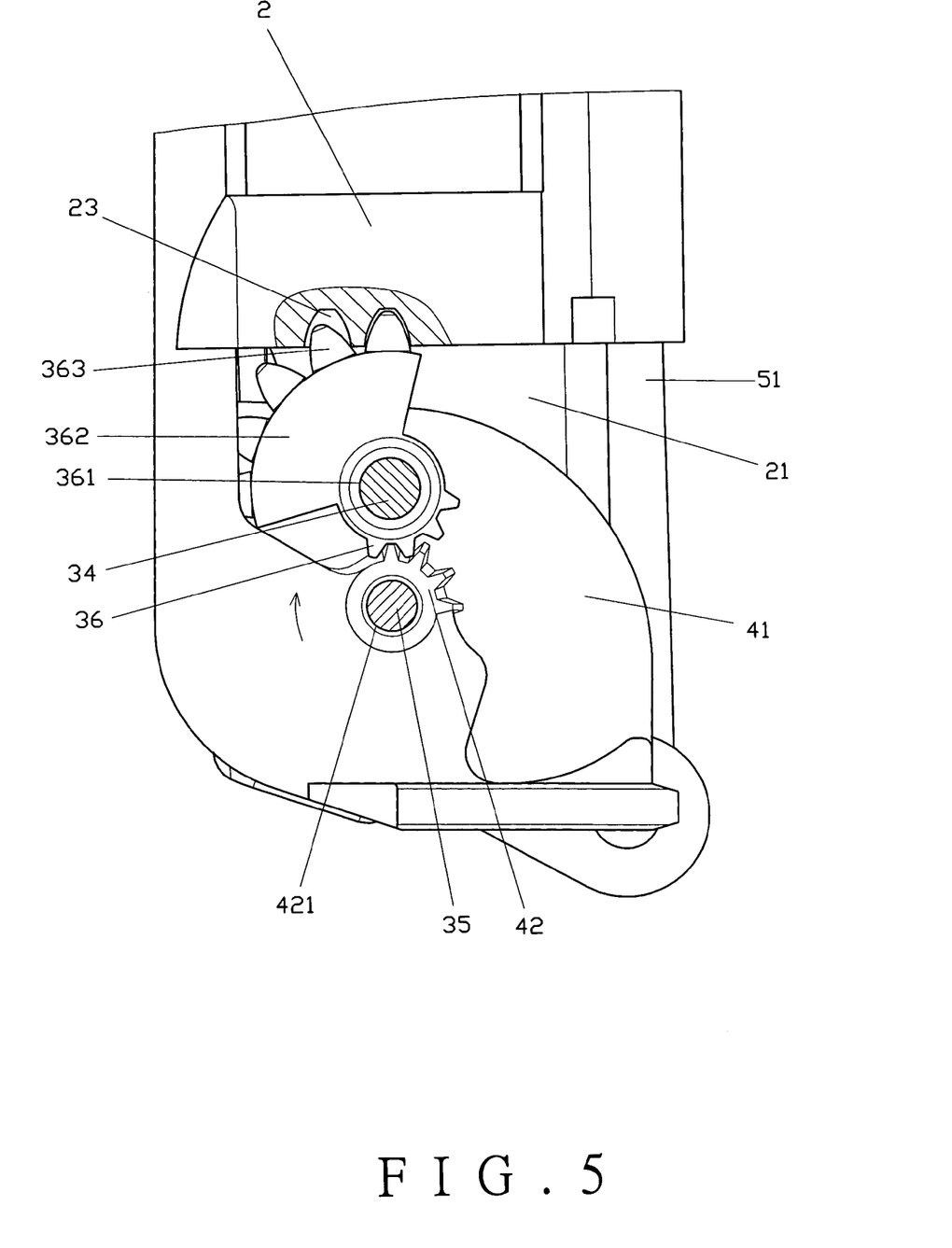
FIG. 5 is a cross-sectional view showing that a stand of the preferred embodiment of the present invention is folded.
Figure 6:
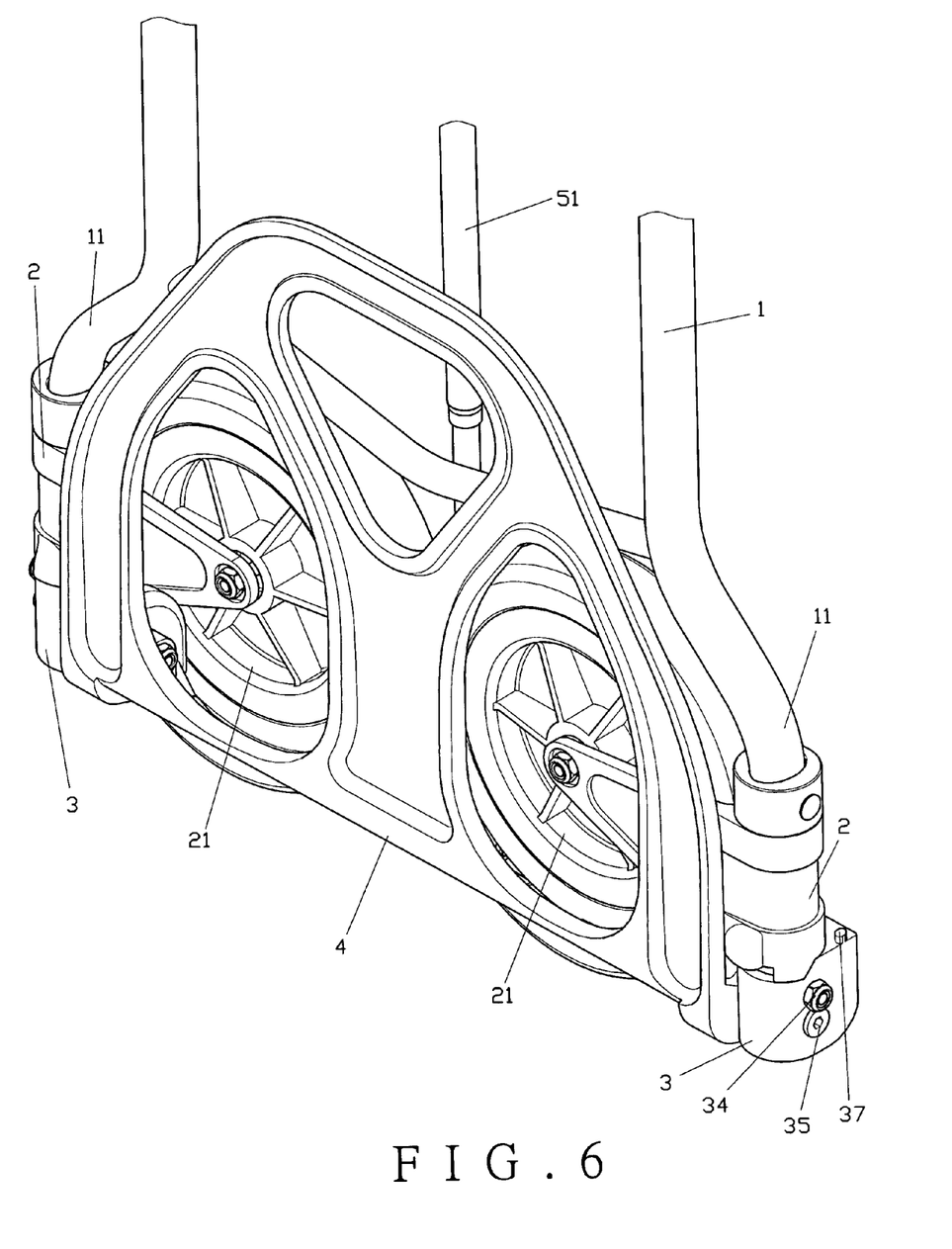
FIG. 6 is a schematic view showing that the preferred embodiment of the present invention is collapsed.

As illustrated in FIG. 5, to collapse both the stand (4) and the wheels (21), it takes only to fold up the stand (4). As the stand (4) is collapsed upwardly, the active gears (42) of the first pivoting holders (41) on respective sides of the stand (4) are synchronously turning upwardly for 90 degrees. Meanwhile, the driven gears (36) respectively engaged with their corresponding active gears (42) are turning for 90 degrees. As the driven gear (36) turns, the checking members (363) on the peripheral edge of the fan-shaped member (362) are merely held in the troughs (23) of the wheel base (2) to rotate the wheel base (2) for a quarter of a turn around the rod (11). Accordingly, when the stand (4) is folded in flushed with the rod (11), the wheel bases (2) drive the wheels (21) to be collapsed in flushed on the side edge of the rod (11) as illustrated in FIG. 6. To fully extend both the stand (4) and the wheels (21), the stand (4) is unfolded for the active gears (42) to drive the driven gears (36) to turn in opposite direction for the wheel bases (2) and the wheels (21) to immediately extend.

What is claimed is:

1. A trolley structure comprising a main frame, wheel bases, retainers, a stand, and a handlebar, the main frame comprising a pair of rods at its bottom and a pair of retractable holders at its top; each wheel base inserted onto the respective rod of the main frame comprising a wheel and an opening; each retainer secured to the respective rod of the main frame being provided with an opening; the stand pivotally connected to the retainers being provided respectively on two sides a first pivoting holder; the handlebar inserted into the retractable holders of the main frame being pivoted with an extension connector and another end of the extension connector being pivoted to the stand;

each wheel base comprising a plurality of troughs at a bottom; each rod of the main frame comprising a first through hole; another first through hole being relatively provided on each retainer; the through holes of each rod and each retainer receiving insertion of a first pivoting member; the first pivoting member being pivotally connected with a driven gear at an outer edge of a retainer; the driven gear having a plurality of axially extending teeth formed at one portion thereof and a plurality of radially protruding checking members formed at another portion thereof to be held in the troughs of the wheel base; each first pivoting holder of the stand comprising an active gear; and the active gear meshing with the driven gear to drive the driven gear to turn; the active and driven gears being pivotally displaceable about substantially parallel axes.

2. The trolley structure of claim 1, wherein each wheel base comprises a chute at the bottom, and each retainer comprises a pole protruding from the top, the pole sliding in the chute for positioning purpose.

3. The trolley structure of claim 1, wherein the stand comprises a second pivoting holder, the second pivoting holder comprising a pair of pivoting holes, the extension connector being provided with a pair of pivoting holes, a third pivoting member being inserted through the pivoting holes to be pivoted to the second pivoting holder.

4. The trolley structure of claim 1, wherein a second through hole is provided on each rod of the main frame, another second through hole being relatively provided on each retainer, an axial hole being provided on the active gear, and a second pivoting member being inserted into and pivoted to the second through holes.

5. The trolley structure of claim 1, wherein the driven gear comprises a fan-shaped member at one side of the driven gear and the checking members of the driven gear are provided on a peripheral edge of the fan-shaped member.

6. The trolley structure of claim 1, wherein the active gear is provided to and made integrated with each first pivoting holder of the stand.

* * * * *